Patented Feb. 2, 1943

2,309,946

UNITED STATES PATENT OFFICE 2,309,946

TEXTILE PRINTING COMPOSITION AND METHOD OF PRINTING THEREWITH

Albert E. Gessler, New York, and Roy A. Pizzarello, Mount Vernon, N. Y., assignors to Interchemical Corporation, New York, N. Y., a corporation of Ohio No Drawing. Application May 27, 1940,
Serial No. 337,490

8 Claims. (Cl. 8—71)

This invention relates to a novel type of composition for the printing of textiles, comprising essentially a hydrophobic liquid capable of forming stable water-in-organic liquid emulsions, said liquid containing uniformly dispersed therethrough a water-insoluble aromatic triazene of the group consisting of diazoamino and diazoimino compounds.

It has been proposed to print textile fabrics with a type of printing paste comprising an aqueous emulsion, the inner phase of which is a water solution of a dye or a dye component, and the outer phase of which is a water-immiscible solution, in volatile hydrophobe organic solvents, of a substance sufficiently film-forming to produce stable emulsions of the water-in-organic liquid type. These printing pastes give unusualy effective results as compared with conventional dyestuff pastes, yielding unusually sharp prints which can be laid down from photogravure cylinders, while employing a minimum of dyestuffs.

One difficulty with these pastes is that when some azo dyestuff components are used as the source of color in the aqueous phase, the resultant emulsions give prints of lower color strength to a greater or lesser degree on standing, necessitating the preparation of the emulsion in the printing plant, with many attendant objections. Thus, most azo dyestuff components which may be stabilized in the dry state with acid alone, or with salts such as zinc chloride, lose color strength very rapidly in aqueous solution; and even the highly stable water-soluble diazoamino and diazoimino compounds tend to lose color slowly.

We have discovered a new type of azo dyestuff composition which overcomes the stability difficulties of the prior art emulsion printing pastes, while producing prints of comparable quality. These new azo dyestuff compositions comprise essentially water-insoluble triazenes of the group consisting of diazoamino and diazoimino compounds which can be reconverted into diazo compounds by aqueous acid uniformly dispersed through a hydrophobic liquid capable of forming stable water-in-organic liquid emulsions. Prior to printing, these compositions are converted to water-in-organic liquid emulsions.

In the preferred form of our invention, the emulsion is formed with an aqueous solution of a compound capable of coupling with the diazo compound formed from the triazene, so that the final printing paste contains one dyestuff component in solution in the water phase of the emulsion, and the other uniformly dispersed through the organic phase. On printing, the coupling component in aqueous solution is absorbed into the cellulose fibers forming the yarns of the fabric, and the triazene is deposited on the outside of the fibers and yarns. When exposed to steam and acid fumes in an acid ager, the triazene is converted to the soluble diazo salt, which then couples with the coupling component. Since the coupling component is already fixed in the fibers in sharp outlines, the color is formed in these sharp outlines, and the resultant print is extremely sharp.

In another form of our invention, the emulsion is treated before printing with an aqueous acid solution added directly or preferably in the form of another emulsion. This aqueous acid solution converts the triazene to the water-soluble diazo salt which transfers from the organic into the aqueous phase; the resultant printing paste is a standard dyestuff solution-in-organic liquid emulsion paste, and may be printed on grounds prepared by impregnation with the coupling component. The principal advantage of our invention in this type of paste is that the water-insoluble triazenes are perfectly stable over extended periods in all hydrophobe organic solvents whether they are soluble or insoluble in them.

In the preferred form of our invention, we find that the degree of dispersion of the triazene in the organic medium has a pronounced effect on the color of the prints. The dispersed compound should be at least microscopically dispersed—i. e., as particles which are not individually visible to the naked eye, and should most preferably be in solution in the solvent to obtain optimum color value.

The dispersion of the triazene in the organic medium cannot be satisfactorily printed on fabrics impregnated with a coupling component, and then coupled in an acid ager, even when made into an emulsion before printing. Since neither component is affixed to the fabric in sharp lines, substantial feathering of the prints occur, and all sharpness is lost.

The water-insoluble triazenes can be prepared from substantially all diazo compounds, by using primary or secondary amines which are free from water-solubilizing groups such as carboxyl and sulfonic acid groups. Typical amines which are satisfactory include ethyl amine, dimethyl amine, diamylamine, dioctyl amine, dicyclohexyl amine, morpholine, methyl aniline, piperidine, etc. Typical diazo compounds are those obtained from dianisidine, 4-chloro-2-amino toluene, ortho dichlorbenzidine, meta nitro para toluidine, paranitraniline, 4-benzoyl amino 2:5 diethoxy aniline, and a host of others.

The diazoamino and diazoimino compounds may ordinarily be prepared by adding a cold aqueous solution of the diazo salt to a cold aqueous solution or suspension of the amine; the stabilized compound precipitates, and may be recovered ordinarily as a crystalline compound or oil.

Typical examples of our invention are the following:

EXAMPLE 1

Stabilization 4-Chloro-2-Amino Anisole With Dimethyl Amine

One tenth mol (15.75 grams) of 4-chloro-2-amino anisole is pasted with 200 cc. of hot water. Water and ice are added to bring the temperature to 10° C. To this mixture 25 cc. of 10N HCl is added, and the base diazotized by the addition of 7 grams NaNO₂ in 25 cc. water, holding at 10° C. When diazotization is complete, the solution is clarified, and the clear lemon colored diazo solution added to a mixture of 18.3 grams of dimethyl amine (25%), 30 grams of sodium carbonate, 200 cc. of water and enough ice to keep the temperature at 0° C. Immediate coupling occurs, with the formation of a yellow precipitate. The mixture, held at 0° C. by the addition of ice as required, is stirred until no free diazo can be detected. Then the precipitate is filtered, washed thoroughly with water, and left to dry at room temperature. The bright yellow powder weighs 38 grams and melts at 140–145° C. This represents a yield of 90.5%. The product is readily soluble in organic solvents, but very insoluble in water—it is stable to the action of alkalies or of cold dilute acids. However, it readily hydrolyzes to the diazo salt and dimethyl amine by the action of cold strong acids or hot dilute solutions of weak acids such as acetic or formic acid. When formulated into an emulsion printing paste together with the sodium salt of the ortho-anisidide of beta hydroxy naphthoic acid, it gives a deep bright red print after the regular acid-aging development.

Following the procedure described above, the following amines are also stabilized with dimethyl amine:

| Amine | Stabilized diazonium compound | Yield | M. P. |
| --- | --- | --- | --- |
|  |  | Per cent | °C. |
| 1. Dianisidine | Light cream colored powder. | 91 | 128–132 |
| 2. 4-chloro-2-amino toluene. | Tan powder | 89.5 | 30–37 |
| 3. Dichlorbenzidine (ortho). | Light tan powder | 87.2 | 187–190 |
| 4. Meta-nitro-para toluidine. | Brown powder | 88 | 48–53 |
| 5. 4-benzoylamino-2:5 diethoxy aniline. | ----do---- | 87 | 115–123 |

EXAMPLE 2

Stabilization of 5-Chloro-2-Amino Toluene With Morpholine

One-tenth mol (14.15 grams) of 5-chloro-2-amino toluene are dissolved in 250 cc. of cold water and 25 cc. 10N hydrochloric acid added. The solution is cooled at 10° to 12° C. by the addition of ice and then 6.9 grams of sodium nitrite dissolved in 25 cc. of water. After 30 minutes diazotization is complete and the solution, still kept to 10 to 12° C., is clarified and filtered. The light yellow colored diazo solution is then added to a cold (0° to 5°) solution of 9.5 grams of morpholine and 30 grams of sodium carbonate in water. A yellow precipitate is immediately formed with the disappearance of free diazo. The reaction mixture is kept at 0° to 5° C. until all the diazo has been taken up. After this time the yellow precipitate is filtered and left to dry at room temperature. 20.8 grams of a light tan powder is obtained. This material melts at 52–55° C., and represents a yield of 87%. It has properties very similar to those of the product of Example 1.

EXAMPLE 3

Stabilization of 4-Chloro-2-Amino Toluene With Morpholine

One-tenth mol (14.15 grams) of 4-chloro-2-amino toluene is added to 150 cc. of hot water. Then 25 cc. of 10N hydrochloric acid is added and the solution diluted with ice and water to 500 cc., so that the temperature is lowered to 10°–12° C. During the course of 5 minutes, 6.9 grams of sodium nitrite dissolved in 25 cc. of water are added. Diazotization is continued for an additional 20–25 minutes when the solution is clarified. The clear yellow filtrate is added to a water solution of 9.5 grams of morpholine and 30 grams of sodium carbonate at 0° C. The temperature is maintained at 0° C. until coupling is complete. The colorless insoluble diazoimino compound is filtered and air dried. 17.3 grams of a white powder which melts at 33°–37° C. is obtained. This crude product represents a yield of 73% and has properties similar to the other morpholine-diazoimino compounds.

EXAMPLE 4

Stabilization of 4-Benzoyl-Amino 2:5-Diethoxy Aniline With Morpholine

One-tenth mol (30 grams) of 4-benzoyl-amino-2:5 diethoxy aniline is pasted with 600 cc. of cold water and 25 cc. of 10N hydrochloric acid added. The mixture is stirred for 5 minutes at 15–18° C. Diazotization is brought about by the addition of 6.9 grams of sodium nitrite dissolved in 25 cc. of water. After keeping the mixture at 15–18° C. for one-half hour, the solution is clarified. The clear diazo solution is then added to a cold solution (0° C.) of 9.5 grams of morpholine and 30 grams of sodium carbonate. A light brown precipitate is immediately formed. The mixture is stirred until no free diazo can be detected, then it is filtered. The precipitate is washed thoroughly with water and left to dry at room temperature. The light brown amorphous powder melts at 128–135° C., and weighs 38 grams (91% yield).

EXAMPLE 5

Stabilization of 4-Chloro-2-Amino Anisole With Dicyclohexyl Amine

One-tenth mol (15.75 grams) of 4-chloro-2-amino anisole is diazotized as in Example 1, and the clear lemon colored solution added at 20° C. to a mixture of 10.9 grams (0.1 m.) of dicyclohexylamine, 30 grams of sodium carbonate, and 200 cc. of water. Coupling takes place immediately with the disappearance of free diazo salt and the formation of a brown oil. The mixture is stirred for three hours at room temperature, during which time the oil changes to a brown solid. This material is filtered and washed with water. The air-dried brown powder weighs 26.3 grams (80% yield), and melts at 94–100° C.

EXAMPLE 6

STABILIZATION OF 4-CHLORO-2-AMINO ANISOLE WITH PIPERIDINE

The diazo solution of one-tenth mol of 4-chloro-2-amino anisole is coupled with 8.5 grams (0.1 m.) piperidine in the presence of 30 grams of sodium carbonate. The coupling is conducted at 0° C. After one hour no free diazo can be detected and the white precipitate is filtered and washed. This material is air-dried and a white powder obtained. The weight of this diazoimino compound which melts at 69–72° C. is 15.8 grams (84% yield).

EXAMPLE 7

STABILIZATION OF 4-CHLORO-2-AMINO ANISOLE WITH METHYL ANILINE

When one-tenth mol of methyl aniline is coupled to an equimolar amount of the diazonium salt of 4-chloro-2-amino anisole, 16.2 grams of the diazoimino compound of methyl aniline and 4-chloro-2-amino anisole are obtained. This represents a yield of 90%. The light tan diazoimino compound melts at 72–80° C.

EXAMPLE 8

PRINTING EMULSIONS

Printing emulsions were made from each of the above compounds, using the following general formula:

*Organic phase*

1.00 gram ethyl cellulose—47% ethoxy, 500 centipoise viscosity
0.01 mol diazoimino compound
0.30 gram pine oil and made up to—

40.00 grams with 2 parts by weight Solvesso #2
1 part by weight toluene

*Aqueous phase*

Coupling component equivalent to diazoimino compound 2.00 grams NaOH (as 40% solution)
0.10 gram Turkey red oil made up to—

60.00 grams with water

The water phase is slowly added to the organic phase while the latter is vigorously stirred. When all the aqueous phase is added, the emulsion is passed through the colloid mill at a .003-inch setting.

These emulsions were observed over an extended period of time, and showed no appreciable color loss.

Prints of each of the emulsions were made and the color developed by treatment in the steam-acid ager immediately after printing. For the acid steaming, a mixture of one part of formic acid 85% and five parts of acetic acid 50% was used. The prints were left in the acid-steamer for 3 minutes. After developing, the prints were rinsed, soaped, and finished as usual. In each case prints were obtained which compared satisfactorily with similar emulsion prints using solutions of commercial water-soluble stabilized diazo compounds.

Examples 1, 2, 3, 5, 6 and 7 are reds. Example 4 is a blue. Other colors can be made as desired, by using other diazo and coupling components.

EXAMPLE 9

USE OF STABILIZED COMPOUND AS COLOR SALT

The organic phase of Example 8 is duplicated, using the diazoimino compound of Example 1. This solution is stable almost indefinitely. Before printing, it may be emulsified by adding strong hydrochloric acid in sufficient amount to hydrolyze the diazoamino compound and form the soluble diazo salt. The aqueous phase is then made up to 60 parts with water, and the paste is ready for printing on a fabric impregnated with a coupling component.

EXAMPLE 10

USE OF TWO EMULSIONS

An emulsion is prepared, using—

1.0 part by weight alkyd resin (35% soya modified glycerol phthalate)
31.0 parts by weight hydrogenated petroleum naphtha (boiling range 135–180° C.)
19.0 parts by weight dianisidine, tetrazotized and stabilized with dimethyl amine (see Example 1), pulped in—
39.0 parts by weight water, and additional
10.0 parts by weight water The stabilized dianisidine compound dissolves in the non-aqueous phase.

A second acid emulsion is made, using—

5.0 parts by weight resin, as above
15.0 parts by weight solvent, as above
23.2 parts by weight 32° Bé. HCl
56.8 parts by weight water The two emulsions are mixed in the ratio of 1 acid emulsion to 1 diazoimino emulsion; about ten minutes are required for complete hydrolysis to produce the tetrazotized dianisidine salt in aqueous solution. The mixed emulsion may be printed direct, or further diluted as desired for the necessary color strength. This is the preferred manner of use where the triazene is to be converted for use as a fast color salt into the unstabilized diazo salt.

While we have shown but a few examples of our invention, it is obvious that examples may be multiplied indefinitely without departing from the scope thereof.

The continuous phase used should obviously be chosen to withstand the action of the acid, alkali or other chemicals used in preparing the paste for printing. The solvent or solvent mixture chosen should be water-immiscible, although the presence of small amounts of water-miscible solvents in a water-immiscible mixture is permissible. The dissolved substance should be sufficiently film-forming in the solvent to be capable of producing a satisfactory emulsion; most water-insoluble film-formers may be used, including bodied oils, soluble heavy metal soaps, natural resins such as damar, artificial resins such as alkyd, hydrophobe urea, cumarone indene, cellulose esters such as cellulose acetate and cellulose nitrate, cellulose ethers such as benzyl and ethyl cellulose, and natural and synthetic rubber and rubber derivatives.

It is desirable, of course, that the external phase be kept at a minimum, and that the film-forming substance be kept as low as possible. Amounts above 5% tend to reduce color value due to dyeing of the substance.

We claim:

1. A composition convertible into a textile printing paste by the admixture of aqueous fluid therein comprising a water-immiscible solution of a water-insoluble organic film-forming agent, in a volatile water-immiscible organic solvent, which solution will produce a stable water-in-organic solution emulsion when water is admixed therewith, said solution having at least microscopically distributed therethrough a water-insoluble triazene of the group consisting of diazoamino and diazoimino compounds, which remains unaffected in the organic continuous phase when a neutral or alkaline aqueous fluid is emulsified into the organic solution, and which reacts to produce a water-dispersible diazo salt when strongly acid aqueous fluid is emulsified into the organic solution.

2. A composition convertible into a textile printing paste by the incorporation of acid therein, comprising an emulsion the inner phase of which is an aqueous fluid and the outer phase of which comprises a water-insoluble triazene of the class consisting of diazoamino and diazoimino compounds, at least microscopically distributed through a water-immiscible solution of a water-insoluble film-forming agent in a volatile water-immiscible organic solvent, the triazene being unaffected by a neutral or alkaline aqueous phase but reactive with a strongly acid aqueous phase to produce a water-soluble diazo salt.

3. A textile printing paste comprising an emulsion the outer phase of which comprises a water-insoluble triazene of the class consisting of diazoamino and diazoimino compounds, at least microscopically distributed through a water-immiscible solution of a water-insoluble film-forming agent in a volatile water-immiscible organic solvent, and the inner phase of which comprises an aqueous solution of a compound capable of coupling with the diazo compound recoverable from the triazene on hydrolysis with acid.

4. The composition of claim 1, in which the triazene is a compound obtained by coupling a diazo compound with morpholine.

5. The composition of claim 2, in which the triazene is a compound obtained by coupling a diazo compound with morpholine.

6. The composition of claim 3, in which the triazene is a compound obtained by coupling a diazo compound with morpholine.

7. The method which comprises printing on textile fabric with an emulsion composition, the outer phase of which comprises a water-insoluble triazene of the class consisting of diazoamino and diazoimino compounds, dispersed colloidally through a water-immiscible solution of a water-insoluble film-forming agent in a volatile water-immiscible organic solvent, and the inner phase of which comprises an aqueous solution of a compound capable of coupling with the diazo compound recoverable from the triazene on hydrolysis with acid, and exposing the printed fabric to acid to hydrolyze the triazene and cause coupling, whereby an ingrain print is produced.

8. The composition of claim 1 in which the organic solvent consists predominantly of hydrocarbon liquids.

ALBERT E. GESSLER.
ROY A. PIZZARELLO.